United States Patent
Chung et al.

(10) Patent No.: US 8,435,661 B2
(45) Date of Patent: May 7, 2013

(54) Z-TYPE BATTERY PACK FOR VEHICLE

(75) Inventors: Chae-Ho Chung, Daejeon (KR); Ye-Hoon Im, Daejeon (KR); Dal-Mo Kang, Daejeon (KR); Jong-Moon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 255 days.

(21) Appl. No.: 12/919,683

(22) PCT Filed: Feb. 27, 2009

(86) PCT No.: PCT/KR2009/000961
§ 371 (c)(1),
(2), (4) Date: Aug. 26, 2010

(87) PCT Pub. No.: WO2009/108013
PCT Pub. Date: Sep. 3, 2009

(65) Prior Publication Data
US 2011/0008657 A1 Jan. 13, 2011

(30) Foreign Application Priority Data

Feb. 28, 2008 (KR) .................. 10-2008-0018411
Feb. 26, 2009 (KR) .................. 10-2009-0016433

(51) Int. Cl.
*H01M 2/12* (2006.01)

(52) U.S. Cl.
USPC .................................... 429/71; 429/120

(58) Field of Classification Search .............. 429/71, 429/120
See application file for complete search history.

(56) References Cited

FOREIGN PATENT DOCUMENTS

| KR | 10-2005-0041323 A | | 5/2005 |
| KR | 10-2005-0070727 A | | 7/2005 |
| KR | 1020050070727 | * | 7/2005 |
| KR | 10-2006-0037606 A | | 5/2006 |
| KR | 1020060037606 | * | 5/2006 |
| KR | 10-2007-0057344 A | | 6/2007 |

* cited by examiner

*Primary Examiner* — Milton I Cano
*Assistant Examiner* — Brent Thomas
(74) *Attorney, Agent, or Firm* — McKenna Long & Aldridge, LLP

(57) ABSTRACT

A flux of cooling gas passing between battery cells is kept uniformly, and accordingly a maximum temperature of the battery cells and temperature variation among the battery cells are greatly decreased. Thus, a life span of a battery pack is greatly elongated, and the possibility of explosion of the battery pack is eliminated.

1 Claim, 9 Drawing Sheets

Z-TYPE BATTERY PACK FOR VEHICLE

TECHNICAL FIELD

The present invention relates to a battery pack for a vehicle, and more particularly to a Z-type battery pack having a cooling channel in which a cooling gas is introduced and discharged in the same direction.

BACKGROUND ART

An electric vehicle obtains its driving energy not from combustion of fossil fuel like existing vehicles but from electric energy. The electric vehicle has advantages of substantially no exhaust gas and very low noise, but the electric vehicle has been not put to practical use since its battery is too heavy and it takes a long time for charging the battery. However, as serious environmental problems and exhaustion of fossil fuels recently become important issues, the development of electric vehicles is accelerated again. In particular, in order to practically use electric vehicles, a battery pack serving as a power source of an electric vehicle should be lighter and smaller, and the time required for charging the battery should be more shortened, so the battery pack is being actively studied.

The battery pack includes a plurality of battery cells connected in series, and heat is generated from the battery cells when the battery pack is charged or discharged. If the heat generated from the battery cells is neglected, the life span of the battery cells is shortened. Thus, in common cases, the battery pack has a cooling channel for eliminating the heat generated from the battery cells.

Figure 1:
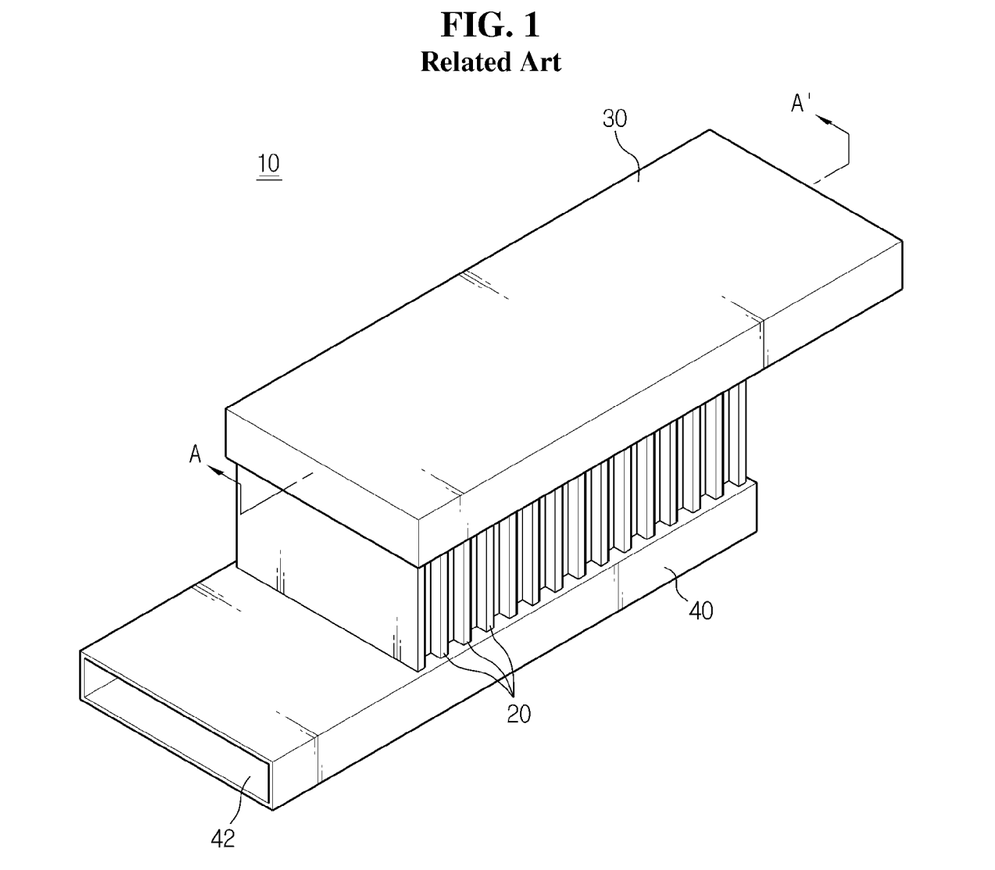
FIG. 1 is a perspective view showing a conventional Z-type battery pack.
Figure 2:
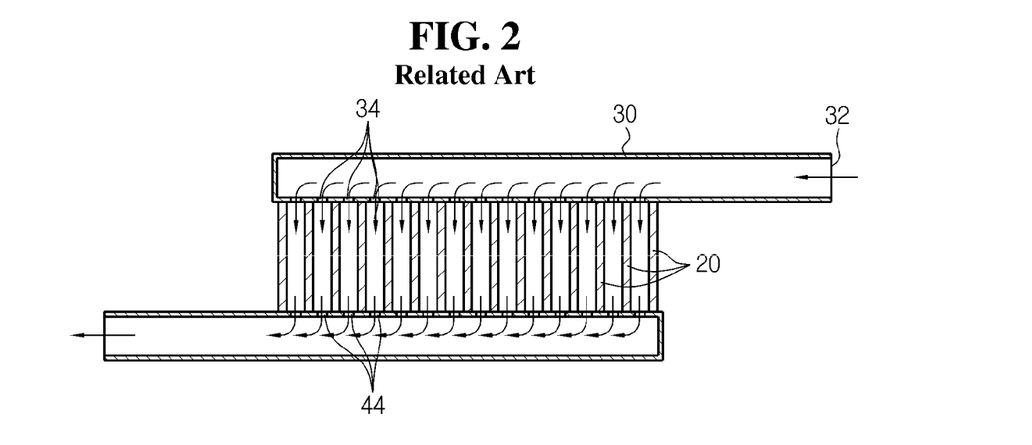
FIG. 2 is a sectional view taken along the line A-A'.

The battery pack may be classified into Z-type battery packs and U-type battery packs depending on the shape of the cooling channel. In the Z-type battery pack, air serving as a cooling gas is introduced to and discharged from the cooling channel in the same direction. In the U-type battery pack, the direction in which air serving as a cooling gas is introduced to the cooling channel is opposite to the direction in which the air is discharged from the cooling channel. Hereinafter, a conventional Z-type battery pack is explained with reference to FIGS. 1 and 2. FIG. 1 is a perspective view showing a conventional Z-type battery pack, and FIG. 2 is a sectional view taken along the line A-A' of FIG. 1.

The Z-type battery pack 10 includes a plurality of battery cells 20 connected in series and cooling channels 30, 40 coupled to the battery cells 20. The cooling channels 30, include a first cooling channel 30 coupled to a top of the battery cell 20 and a second cooling channel 40 coupled to a bottom of the battery cell 20.

One side 32 of the first cooling channel 30 is open such that a cooling gas may be introduced therein. Also, a plurality of slits 34 are formed in a lower surface of the first cooling channel 30, not coupled with the battery cells 20, such that the introduced cooling gas may be discharged toward the battery cells 20.

A plurality of slits 44 are formed in an upper surface of the second cooling channel 40, not coupled with the battery cells 20, such that the cooling gas discharged from the first cooling channel 30 is introduced. Also, one side 42 of the second cooling channel 40 is open such that the cooling gas introduced through the slits 44 may be discharged to the outside.

The cooling gas introduced through the side 32 is discharged to the outside while passing through the slits 34, the spaces between the battery cells 20, and the slits 44 in order. In this procedure, the cooling gas absorbs heat from the battery cells 20, so the battery cells 20 may be cooled.

However, in the battery pack 10, as being apart from the side 32 farther, the difference of pressures between the first cooling channel 30 and the second cooling channel 40 is increased. Thus, among the spaces between the battery cells 20, any space located farther from the side 32 allows a larger amount of cooling gas to pass. This phenomenon causes some problems. In other words, among the battery cells 20, battery cells located near the side 32 may be not sufficiently cooled, and temperature variation of the battery cells 20 is too great, as shown in FIG. 3.

Figure 3:
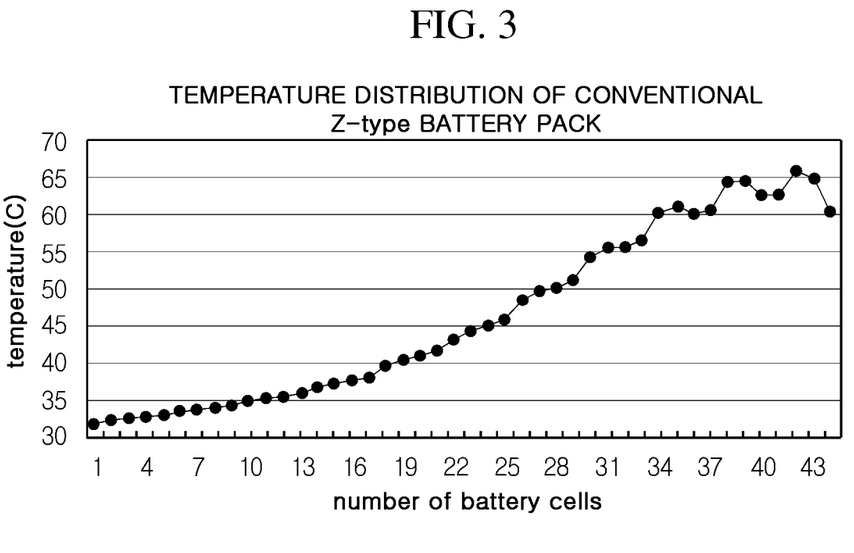
FIG. 3 is a graph representing temperature distribution of battery cells included in the conventional Z-type battery pack.

FIG. 3 is a graph showing temperature distribution of the battery cells 20 included in the battery pack 10. In FIG. 3, a horizontal axis represents the number of each battery cell 20, and a vertical axis represents temperature of each battery cell 20. The number of battery cell 20 is set to increase in a right direction based on FIG. 2. Also, the results shown in FIG. 3 are derived under the condition that loads of 40A are applied to a battery pack 10 including 44 battery cells 20 with an ambient air of 30° C.

Seeing FIG. 3, it would be found that the temperature of battery cells over the number of 28 exceeds 50° C. In this case, the battery cell cannot be used for a long time, and the life of battery cell is rapidly reduced. Even worse, the battery cell may be exploded.

In addition, seeing FIG. 3, a difference between the maximum temperature and the minimum temperature of battery cells is about 35° C. In this case, life spans of battery cells are seriously different. If just some of the battery cells included in the battery pack run out, the entire battery pack should be exchanged, so other battery cells having a residual life cannot be used due to some run-out battery cells.

DISCLOSURE

Technical Problem

The present invention is designed to solve the problems of the prior art, and therefore it is an object of the present invention to provide a Z-type battery pack for an electric vehicle, which may decrease a maximum temperature of battery cells and reduce temperature variation among battery cells in comparison to conventional cases.

Technical Solution

In order to accomplish the above object, the present invention provides a Z-type battery pack for an electric vehicle, in which an introduction direction of a cooling gas is identical to a discharging direction thereof, the Z-type battery pack including: a plurality of battery cells arranged as being connected in series; a first cooling channel coupled to one ends of the battery cells to control a flow of a cooling gas such that a cooling gas introduced from the outside is discharged between the battery cells; a second cooling channel coupled to the other ends of the battery cells to control a flow of the cooling gas such that the cooling gas passing between the battery cells is discharged to the outside; and a flux control plate located in the second cooling channel to uniformly keep a flux of the cooling gas passing between the battery cells.

Preferably, the flux control plate includes a blocking plate extending from an upper surface of the second cooling channel toward a lower surface thereof and preventing the cooling gas passing between the battery cells from being directly discharged to the outside; and a flow guide plate extending from one end of the blocking plate along a length direction of the second cooling channel, the flow guide plate guiding a flow of the cooing gas such that the cooling gas passing between the battery cells is moved in a direction opposite to the introduction direction of the cooling gas and then discharged to the outside.

Preferably, the flow guide plate has a length in the range from 70% to 95% of a distance between battery cells located at the outermost positions. If the length of the flow guide plate is shorter than the lower limit, the flux of cooling gas passing between the battery cells may not be kept uniformly. If the length of the flow guide plate is longer than the upper limit, an excessive load is applied to the motor supplying the cooling gas to the first cooling channel. If the length of the flow guide plate is over the lower limit, temperature variation of the battery cells may be kept to 5° C. or less, so the life span of the battery pack may be elongated.

Preferably, the flow guide plate has a width identical to a width of the second cooling channel. In this case, the cooling gas passing between the battery cells cannot flow between the flow guide plate and the side of the second cooling channel, so the flux of cooling gas flowing between the battery cells may be more uniformly kept.

Preferably, a distance between the flow guide plate and the upper surface of the second cooling channel is identical to a distance between the flow guide plate and a lower surface of the second cooling channel.

Preferably, the flow guide plate is extended in parallel with a length direction of the second cooling channel. However, as an alternative, the flow guide plate may be extended with a slope such that the flow guide plate is closer to an upper or lower surface of the second cooling channel as approaching to an end thereof. At this time, the slope of the flow guide plate is preferably controlled by fixing a location of an end portion of the flow guide plate and then adjusting a length of the blocking plate.

Advantageous Effects

According to the present invention, a flux of cooling gas passing through spaces between battery cells is kept uniformly, and accordingly a maximum temperature of the battery cells and temperature variation among the battery cells are greatly decreased in comparison to conventional cases, so the life span of the battery pack is extended very long and the possibility of explosion of the battery pack is eliminated.

BEST MODE

Hereinafter, preferred embodiments of a Z-type battery pack for an electric vehicle according to the present invention will be described in detail with reference to the accompanying drawings.

Figure 4:
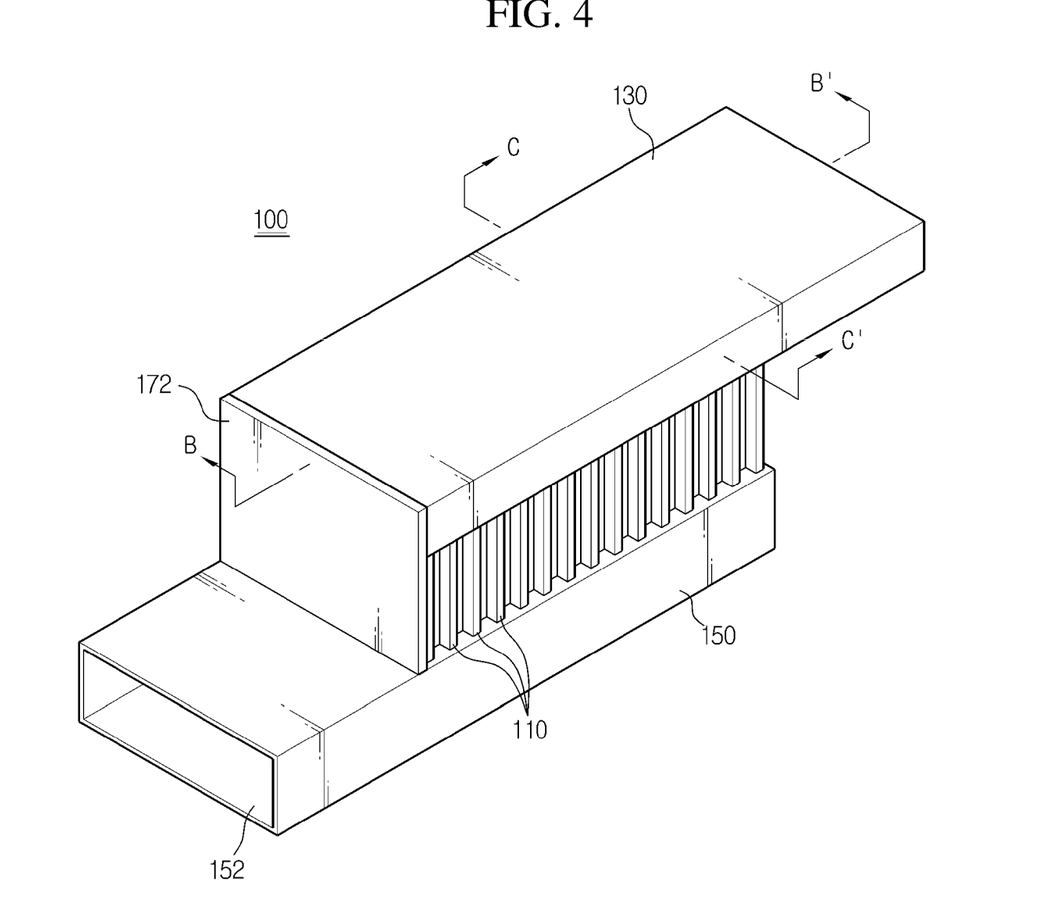
FIG. 4 is a perspective view showing a Z-type battery pack for an electric vehicle according to a first embodiment of the present invention.
Figure 5:
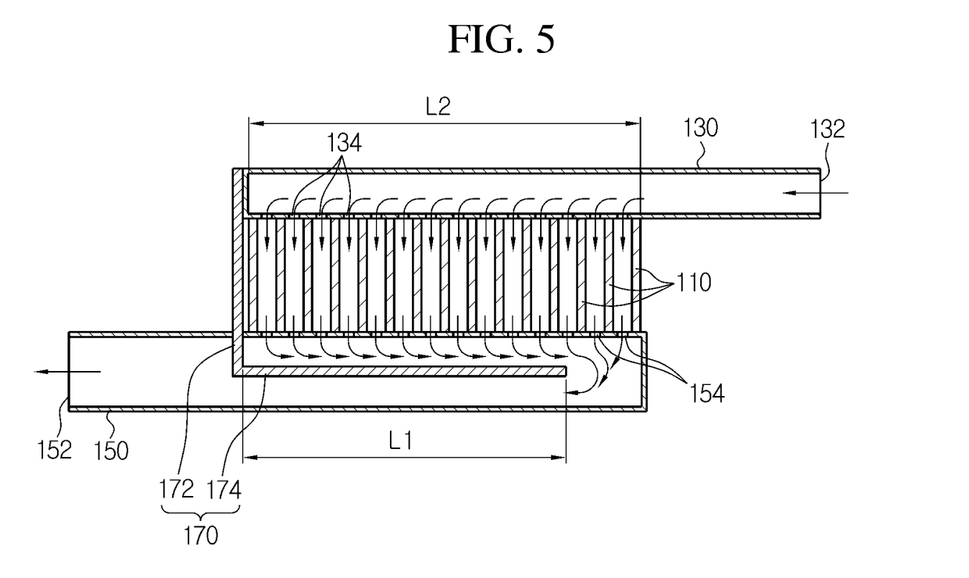
FIG. 5 is a sectional view taken along the line B-B' of FIG. 4.
Figure 6:
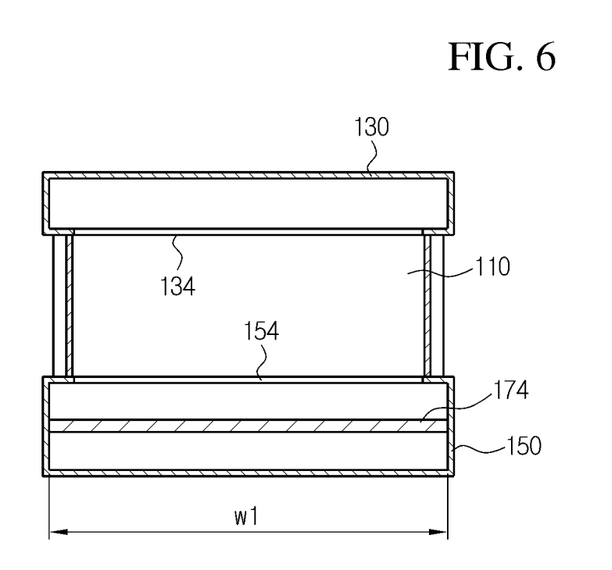
FIG. 6 is a sectional view taken along the line C-C' of FIG. 4.
Figure 7:
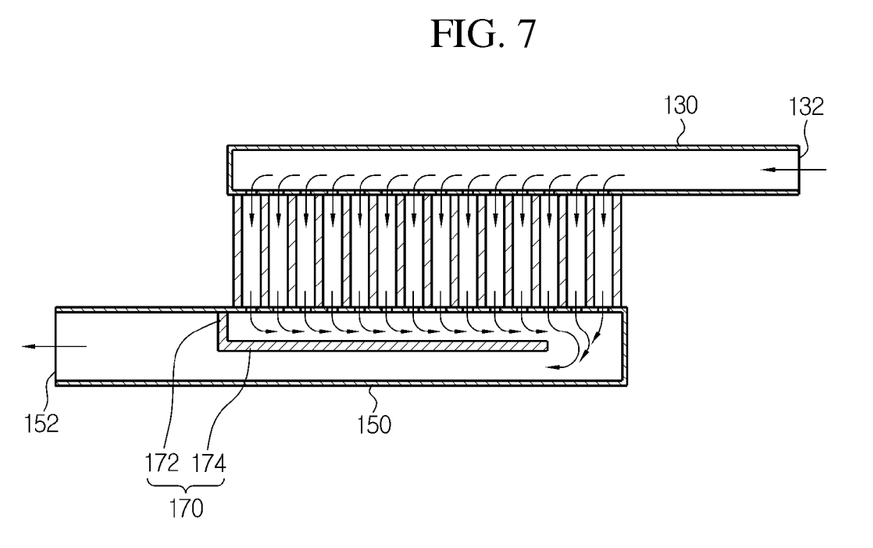
FIG. 7 is a sectional view showing a Z-type battery pack for an electric vehicle according to a second embodiment of the present invention.
Figure 8:
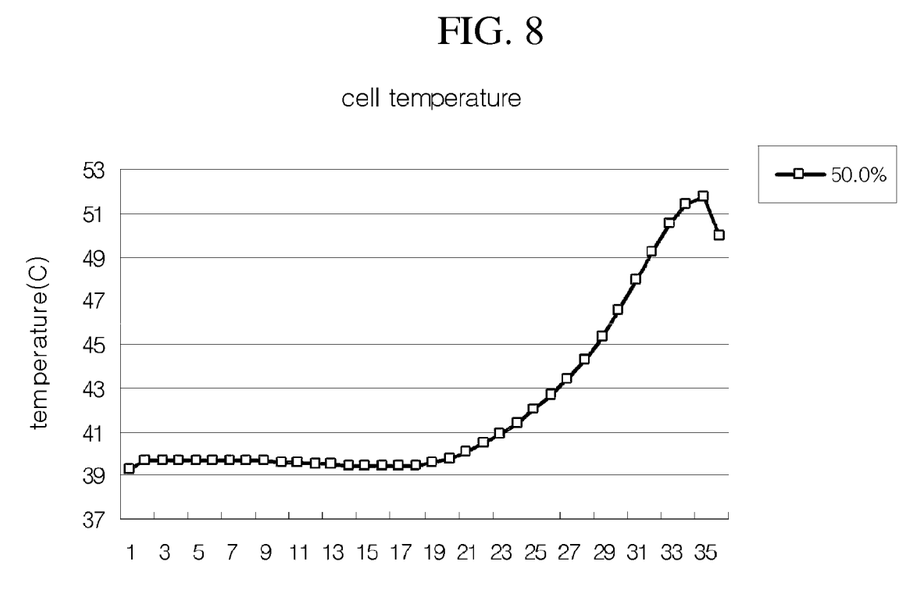
FIGS. 8 to 15 are graphs representing temperature of battery cells according to length L1 of flow guide plates, respectively.
Figure 9:
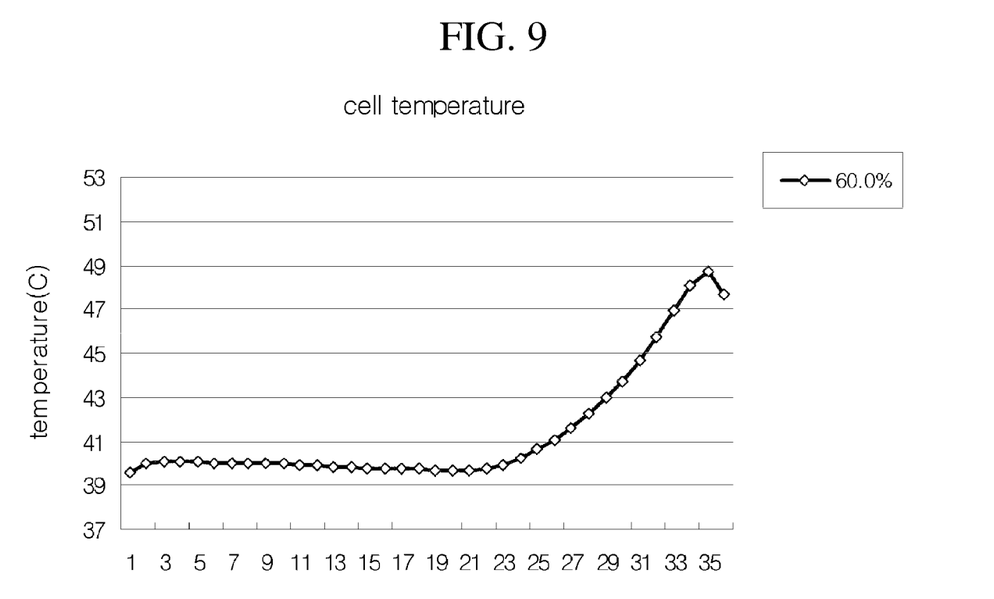
Figure 10:
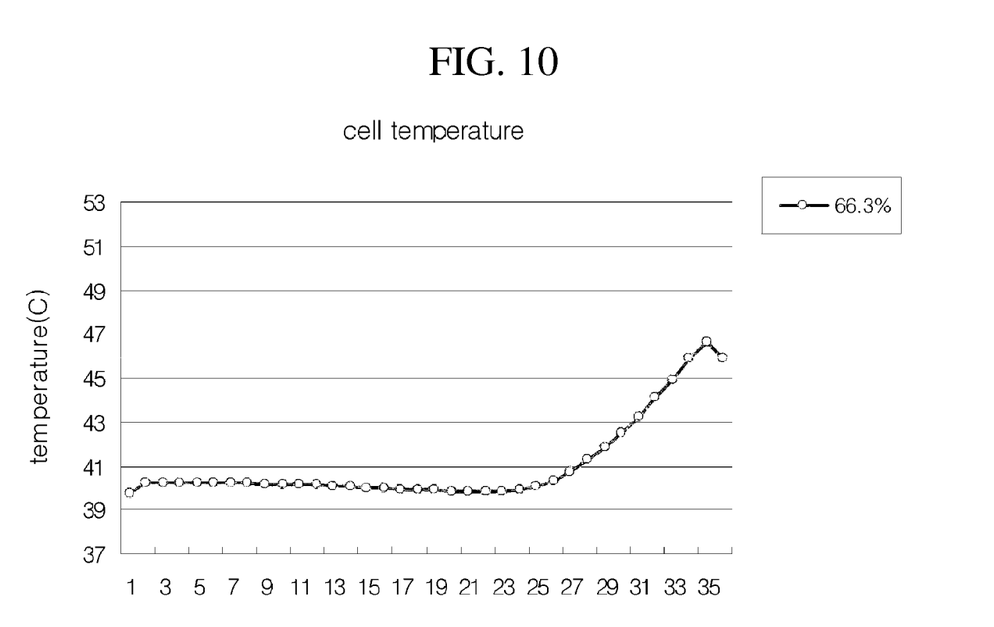
Figure 11:
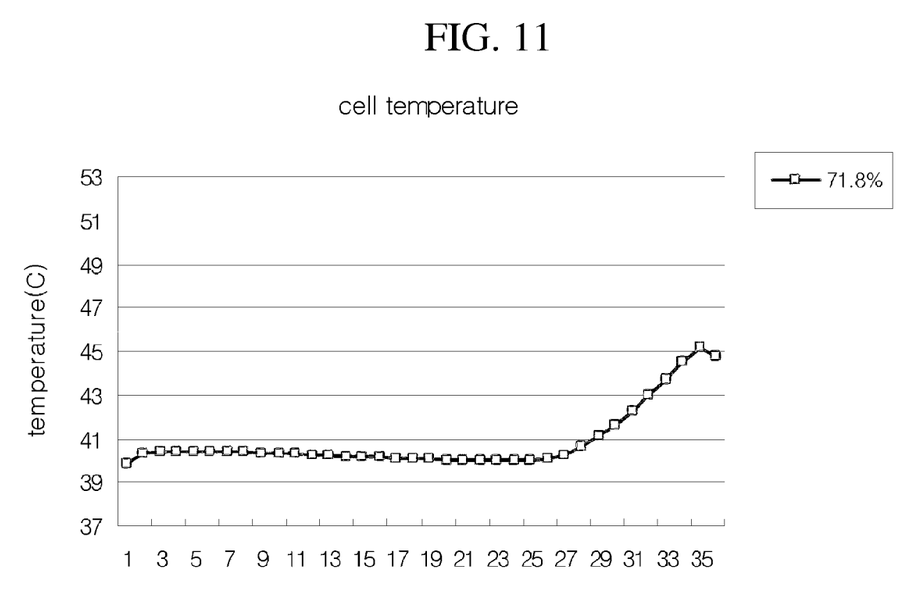
Figure 12:
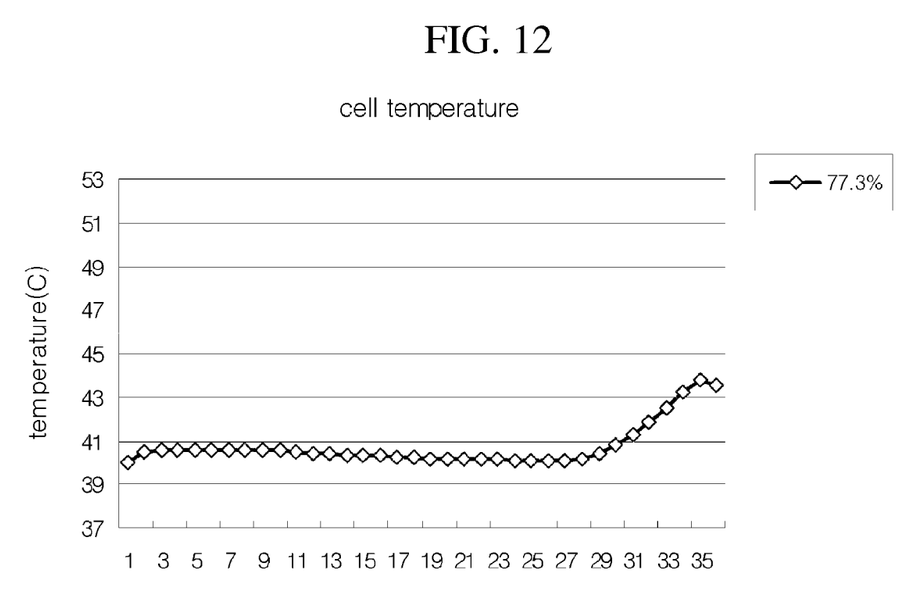
Figure 13:
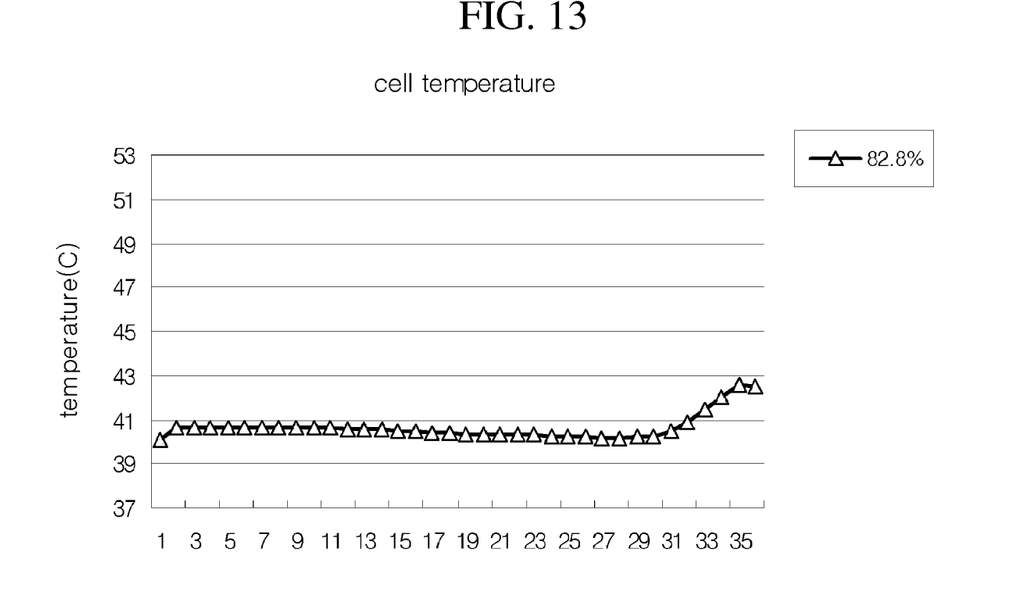
Figure 14:
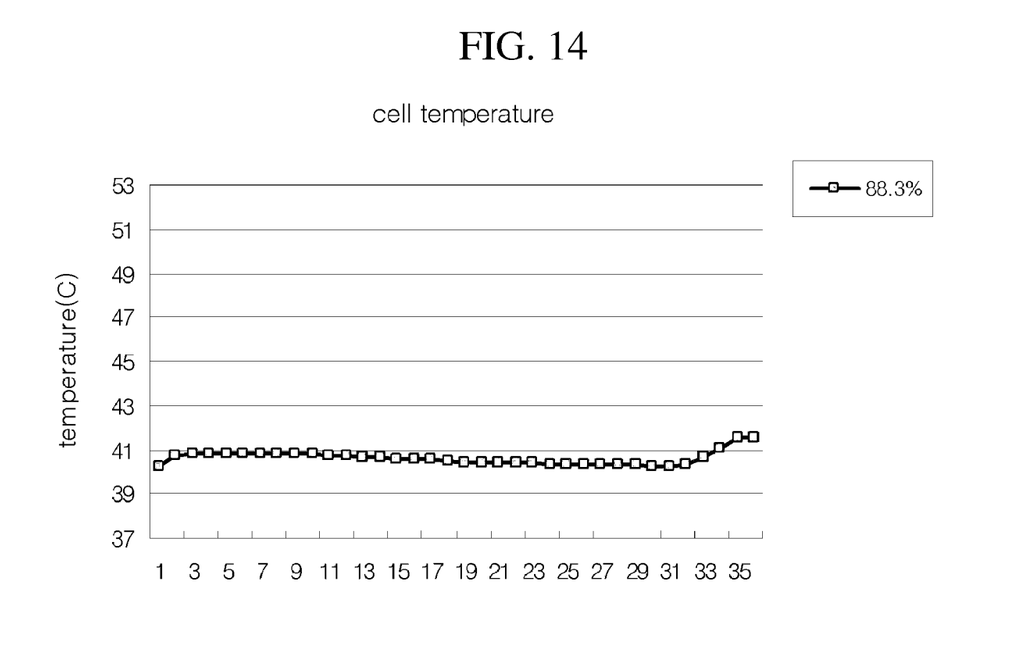
Figure 15:
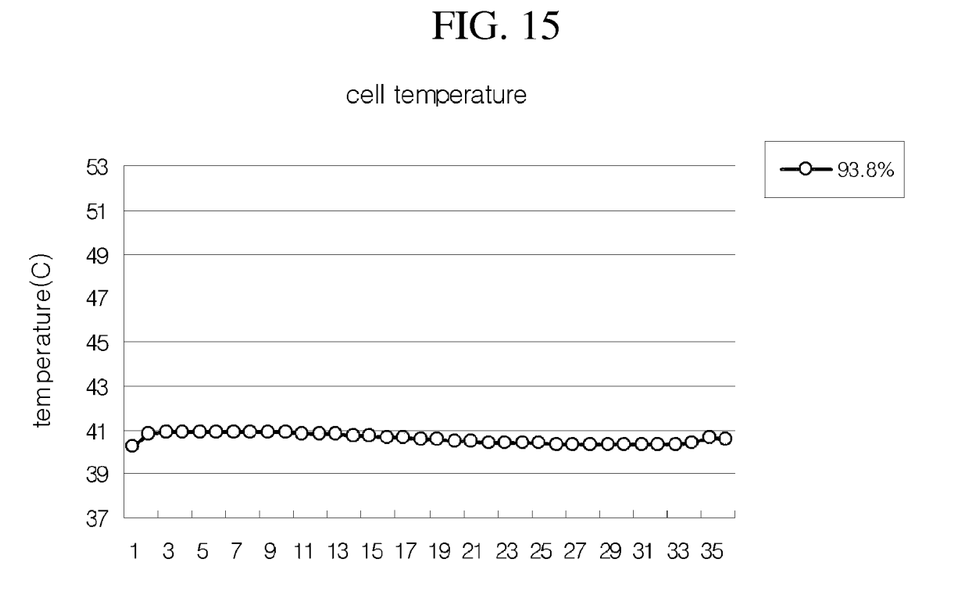

FIG. 4 is a perspective view showing a Z-type battery pack for an electric vehicle according to a first embodiment of the present invention, FIG. 5 is a sectional view taken along the line B-B' of FIG. 4, FIG. 6 is a sectional view taken along the line C-C' of FIG. 4, and FIG. 7 is a sectional view showing a Z-type battery pack for an electric vehicle according to a second embodiment of the present invention.

The Z-type battery pack 100 according to the present invention includes a plurality of battery cells 110, a first cooling channel 130 coupled to one ends of the battery cells 110, a second cooling channel 150 coupled to the other ends of the battery cells 110, and a flux control plate 170 located in the second cooling channel 150.

The plurality of battery cells 110 are arranged as being connected in series, and the battery cells 110 may be arranged in one row or multiple rows. Voltage charged to the battery cells 110 is used for driving an electric vehicle, and the battery cells 110 are charged again if the battery cells 110 are discharged. The battery cells 110 repeat charging and discharging as mentioned above, during which heat is generated from the battery cells 110.

One side 132 of the first cooling channel 130 is open such that a cooling gas for cooling the battery cells is introduced from the outside. Also, a plurality of slits 134 are formed in a lower surface of the first cooling channel 130, not coupled with the battery cells 110, such that the introduced cooling gas may be discharged toward the battery cells 110. The cooling gas introduced through the side 132 is flowed into spaces between the battery cells 110 through the plurality of slits 134 to cool the battery cells 110.

A plurality of slits 154 are formed in an upper surface of the second cooling channel 150, not coupled with the battery cells 110, such that the cooling gas passing through the spaces between the battery cells 110 are introduced thereto. Also, one side 152 of the second cooling channel 150 is open such that the cooling gas introduced through the slits 153 may be discharged to the outside. At this time, a discharging direction of the cooling gas is identical to a direction in which the cooling gas is introduced to the first cooling channel 130.

The flux control plate 170 is located in the second cooling channel 150 to uniformly keep a flux of cooling gas passing between the battery cells 110. Hereinafter, embodiments of the flux control plate 170 having the above function are explained in detail.

The flux control plate 170 includes a blocking plate 172 and a flow guide plate 174. The blocking plate 172 prevents the cooling gas passing between the battery cells 110 from being directly discharged to the outside through the side 152. One end of the blocking plate 172 is attached to one side of the first cooling channel 130, and the blocking plate 172 is extended from one side of the first cooling channel 130 through the upper surface of the second cooling channel 150 to the inside of the second cooling channel 150. A width of the blocking plate 172 is preferably identical to a width W1 of the second cooling channel 150 such that the cooling gas is not directly discharged to the outside through the side 152.

The flow guide plate 174 guides the flow of cooling gas such that the cooling gas passing between the battery cells 110 is moved in a direction opposite to an introduction direction of the cooling gas (namely, a direction in which the cooling gas is introduced to the first cooling channel 130) and then discharged to the outside through the side 152. The flow guide plate 174 is extended in parallel with a length direction of the second cooling channel 150 from one end of the blocking plate 172. The flow guide plate 174 has a width identical to the width W1 of the second cooling channel.

The battery pack 100 according to the present invention includes the flux control plate 170 as mentioned above. In this case, regardless of the distance from the side 132, the pressure difference between the first cooling channel 130 and the second cooling channel 150 is formed more uniformly in comparison to conventional cases, so a flux of cooling gas passing through the spaces formed between the battery cells 110 becomes very uniform in comparison to conventional cases regardless of the distance from the side 132. Thus, the maximum temperature of the battery cells 110 may be decreased rather than conventional cases, and temperature variation among the battery cells 110 may also be reduced rather than conventional cases.

Meanwhile, the uniformity of flux of the cooling gas passing between the battery cells 110 becomes better as a length L1 of the flow guide plate 174 is greater. However, as the length L1 of the flow guide plate 174 is greater, a load applied to a motor (not shown) supplying the cooling gas is increased. Thus, the length L1 of the flow guide plate 174 should be set in consideration of the uniformity of flux of the cooling gas passing between the battery cells 110 and the load of a motor supplying the cooling gas.

Considering the uniformity of flux of the cooling gas passing between the battery cells 110 and the load of a motor supplying the cooling gas, the length L1 of the flow guide plate 174 is preferably selected in the range from 70% to 95% of a length L2 between battery cells located at outermost positions. If the length L1 of the flow guide plate is shorter than the lower limit, the flux of cooling gas passing between the battery cells 110 may not be kept uniformly. If the length of the flow guide plate is longer than the upper limit, an excessive load is applied to the motor supplying the cooling gas to the first cooling channel. If the length L1 of the flow guide plate is over the lower limit, temperature variation of the battery cells 110 may be kept to 5° C. or less, so the life span of the battery pack 100 may be elongated.

The uniformity of the flux of cooling gas passing between the battery cells 110 become better as the width of the flow guide plate 174 is longer. Thus, the width of the flow guide plate 174 is preferably set identically to the width W1 of the second cooling channel, as explained above. However, if there is no serious difference in the flux of cooling gas, the width of the flow guide plate 174 may be set smaller than the width W1 of the second cooling channel.

In addition, as the distance between the flow guide plate 174 and the upper surface of the second cooling channel is longer, the load applied to the motor (not shown) supplying the cooling gas is increased. Thus, considering only the load applied to the motor, it is preferred to decrease the distance between the flow guide plate 174 and the upper surface of the second cooling channel 150. However, the uniformity of the flux of cooling gas passing between the battery cells 110 is deteriorated when the distance between the flow guide plate 174 and the upper surface of the second cooling channel 150 is longer or shorter than a distance between the flow guide plate 174 and a lower surface of the second cooling channel 150. Thus, considering both of the uniformity of the flux of cooling gas passing through the battery cells 110 and the load applied to the motor supplying the cooling gas, the distance between the flow guide plate 174 and the upper surface of the second cooling channel 150 is preferably set identically to the distance between the flow guide plate 174 and the lower surface of the second cooling channel 150.

Meanwhile, in the above embodiment, the blocking plate 172 is configured to pass through the upper surface of the second cooling channel 150. However, as an alternative, the blocking plate 172 may be configured as being positioned only in the second cooling channel, as shown in FIG. 7.

In addition, in the above embodiment, the flow guide plate 174 is configured in parallel with the length direction of the second cooling channel 150. However, as an alternative, the flow guide plate 174 may be configured with a slope such that the flow guide plate 174 becomes closer to the upper or lower surface of the second cooling channel 150 as approaching its end. At this time, the slope of the flow guide plate 174 may be controlled by fixing a location of an end portion of the flow guide plate 174 and then adjusting a length of the blocking plate 172. As a distance between the end of the flow guide plate 174 and the upper surface of the second cooling channel 150 is shorter, the load applied to the motor supplying the cooling gas is increased. Thus, if the slope of the flow guide plate 174 is controlled as mentioned above, the uniformity of the flux of cooling gas passing between the battery cells 110 is ensured, and at the same time, the load applied to the motor supplying the cooling gas may be kept uniformly.

The inventor conducted computer simulations for measuring temperature of battery cells included in the battery pack 100 shown in FIG. 5. The simulation results are shown in FIGS. 8 to 15. FIGS. 8 to 15 are graphs representing temperature distribution of the battery cells 110 included in the battery pack 100. In FIGS. 8 to 15, a horizontal axis represents the number of each battery cell 110, and a vertical axis represents temperature of each battery cell 110. The number of each battery cell 110 is increased in a right direction based on FIG. 5. Also, the width of the flow guide plate 174 is set identically to the width W1 of the second cooling channel. In addition, the length L1 of the flow guide plate 174 is respectively set as 50.0%, 60.0%, 66.3%, 71.8%, 77.3%, 82.8%, 88.3% and 93.8% of the length L2 between the battery cells located at the outermost locations. The flow guide plate 174 is formed in parallel with the length direction of the second cooling channel 150, and the flow guide plate 174 is installed at a center between the upper and lower surfaces of the second cooling channel 150. The results shown in FIGS. 8 to 15 are derived under the condition that loads of 40A are applied to the battery pack 100 including 35 battery cells 110 with an ambient air of 35° C.

Seeing FIGS. 8 to 15, temperature deviation of the battery cells 110 is decreased as the length L1 of the flow guide plate 174 is longer, and it would be understood that a ratio of L1/L2 is 70% or above, the temperature variation becomes 5° C. or less. If the temperature variation is 5° C. or below, the life span of the battery pack 100 may be elongated.

Meanwhile, if the ratio of L1/L2 exceeds 95%, overload is applied to the motor, undesirably.

What is claimed is:
1. A battery pack for an electric vehicle, in which an introduction direction of a cooling gas is identical to a discharging direction thereof, the battery pack comprising:
    a plurality of battery cells arranged as being connected in series;
    a first cooling channel coupled to one end of the battery cells to control a flow of a cooling gas such that a cooling gas introduced from the outside is discharged between the battery cells;

a second cooling channel coupled to the other end of the battery cells to control a flow of the cooling gas such that the cooling gas passing between the battery cells is discharged to the outside; and a flux control plate located in the second cooling channel to uniformly keep a flux of the cooling gas passing between the battery cells, wherein the flux control plate includes:

a blocking plate (172) extending from an upper surface of the second cooling channel toward a lower surface thereof and preventing the cooling gas passing between the battery cells from being directly discharged to the outside; and a flow guide plate (174) extending from one end of the blocking plate along a length direction of the second cooling channel, the flow guide plate guiding a flow of the cooling gas such that the cooling gas passing between the battery cells is moved in a direction opposite to the introduction direction of the cooling gas and then discharged to the outside, wherein the flow guide plate has a length (L1) in a range from 70% to 95% of a distance (L2) between battery cells located at the outermost positions, wherein the flow guide plate and the blocking plate have a width identical to a width of the second cooling channel, wherein a distance between the flow guide plate and the upper surface of the second cooling channel is identical to a distance between the flow guide plate and a lower surface of the second cooling channel, and wherein the flow guide plate is extended in parallel with a length direction of the second cooling channel.

\* \* \* \* \*